(12) United States Patent
Gotter (10) Patent No.: US 10,893,672 B1
(45) Date of Patent: Jan. 19, 2021

(54) TURKEY DECOY

(71) Applicant: Wade Aaron Gotter, Ancona, IL (US)

(72) Inventor: Wade Aaron Gotter, Ancona, IL (US)

(73) Assignee: Alive Action Decoys, LLC, Ancona, IL (US)

( * ) Notice: Subject to any disclaimer, the term of this patent is extended or adjusted under 35 U.S.C. 154(b) by 330 days.

(21) Appl. No.: 15/932,469

(22) Filed: Mar. 3, 2018

Related U.S. Application Data (60) Provisional application No. 62/600,944, filed on Mar. 6, 2017.

(51) Int. Cl.
*A01M 31/06* (2006.01)

(52) U.S. Cl.
CPC .................... *A01M 31/06* (2013.01)

(58) Field of Classification Search
CPC ....................................................... A01M 31/06
See application file for complete search history.

(56) References Cited

U.S. PATENT DOCUMENTS

| | | | |
|---|---|---|---|
| 6,070,356 A | 6/2000 | Brint et al. | |
| 6,092,322 A | 7/2000 | Samaras | |
| 6,408,588 B1 | 6/2002 | Cornwll, Jr. et al. | |
| 6,574,902 B1 | 6/2003 | Conger | |
| 6,708,440 B2 | 3/2004 | Summers et al. | |
| 7,231,737 B2 | 6/2007 | Bradford | |
| 7,784,213 B1* | 8/2010 | Primos | A01M 31/06 43/2 |
| 8,230,638 B1* | 7/2012 | Dunaway | A01M 31/06 43/2 |
| 8,925,240 B2 | 6/2015 | Beal | |
| 2007/0151139 A1* | 7/2007 | O'Dell | A01M 31/06 43/2 |
| 2008/0216381 A1* | 9/2008 | Wyant | A01M 31/06 43/2 |
| 2010/0115818 A1* | 5/2010 | Rogers | A01M 31/06 43/2 |
| 2012/0042561 A1* | 2/2012 | Bain | A01M 31/06 43/3 |
| 2013/0291422 A1* | 11/2013 | Beal | A01M 31/06 43/2 |
| 2016/0249601 A1* | 9/2016 | Cagle | A01M 31/06 43/2 |
| 2017/0049094 A1* | 2/2017 | Altieri, II | A01M 31/06 |
| 2017/0176125 A1* | 6/2017 | Pauley | F41A 23/04 |
| 2017/0238530 A1* | 8/2017 | Cagle | G08C 17/02 |
| 2017/0280705 A1* | 10/2017 | Burcham | B29C 65/48 |
| 2018/0035660 A1* | 2/2018 | Zahourek | A01M 31/06 |

FOREIGN PATENT DOCUMENTS

CA  2866994 A1 * 4/2015 ............ A01M 31/06

* cited by examiner

*Primary Examiner* — Monica L Barlow
*Assistant Examiner* — Aaron M Rodziwicz
(74) *Attorney, Agent, or Firm* — Timothy Stevens; Robert C. Corbett; Technology Law, PLLC (57) ABSTRACT

A turkey decoy system wherein the tail of the decoy can be moved from a lowered position to a raised and fanned position by a pair of control lines, wherein a fanned tail of the decoy can be oscillated by the control lines, wherein the decoy can be moved forward and backward by the pair of control lines, and wherein the decoy can be oscillated by the control lines.

13 Claims, 11 Drawing Sheets

TURKEY DECOY

The instant application claims priority to U.S. Provisional Patent Application Ser. No. 62/600,944 filed Mar. 6, 2017. The instant invention relates to hunting decoys and more specifically to a turkey hunting decoy. As discussed in U.S. Pat. No. 7,231,737, turkey decoys have been produced in many forms and fall primarily under two categories: static decoys and motion decoys. The primary intent of both types of decoys is to attract a live turkey for observation or hunting purposes. Stationary or static decoys represent the general shape, size, color and feather pattern of a live turkey. These decoys are placed in an open area and used to attract a wild turkey, which may be passing by. These decoys are very basic and rely on the ability of a passing turkey to recognize the shape as a fellow turkey. Motion decoys are designed imitate the movements of a live turkey. The movements of the decoy are used to catch the attention of a passing turkey. The motions of the decoys are usually an attempt to mimic either one or more motions of a live turkey. The movement of these decoys is sometimes as simple as placing a static decoy on a pivot point which allows the wind to move the decoy side to side, or rock back and forth. The wind induced motion decoy is one of the simplest and most popular. U.S. Pat. No. 6,092,322 shows an example of wind-induced movements of a turkey decoy.

BACKGROUND OF THE INVENTION

The motion of some decoys can be initiated by an operator with a manual pull string, push rod or electrical motor. The manual activation capability gives the operator the advantage of triggering the decoy's movement at an opportune time rather than relying on the randomness of the wind. Some motion decoys use a motorized device that produces random movement of the decoy. Such a device is disclosed in U.S. Pat. No. 6,070,356. The use of random motorized movement does not consistently give a level of certainty needed to attract a live turkey. Such movement may occur when the live turkey is out of sight or they may occur too often when a turkey is close and frighten the turkey away. In addition, motorized movement of a turkey decoy is not legal in many hunting locations.

During the mating season the wild male turkey will display its tail feathers by spreading them into a semi-circular fan shape as part of the mating strut. The tail feathers begin in a prone or close to horizontal position behind the bird and then rise vertically while simultaneously spreading into a fan shape. This action is done to demonstrate the dominance of the male turkey and thus convince a female to mate with him. The female turkey is attracted to the sight of the male turkey's fantail. Because of their competitive nature it has also been observed that male turkeys will also be attracted to the fan tail display. The males will compete for a hen by trying to out strut their fellow turkeys and/or by sparing. The sight of a strutting male will excite and irritate a fellow male turkey. The male turkey then will engage the competitor and attempt to drive them off or try to out strut them. If a male turkey has already gathered a group of females it is very difficult to draw him away from their company. The sight of a competing male turkey that may steal his mates is one of the few things that will pull him away from his group of females.

U.S. Pat. No. 7,231,737 discloses a turkey tail fan moved back and forth from a prone unfanned position to an upright and fanned position by pulling on a line. U.S. Pat. No. 6,574,902 discloses a decoy mounted on a track, the decoy being moved back and forth on the track by pulling on a line, the decoy being bobbed by pulling on a second line. U.S. Pat. No. 6,408,558 discloses a turkey decoy mounted on a trackway, the decoy moved back and forth on the track by pulling on a line. It would be an important advance in the art of turkey hunting decoys if a turkey decoy were discovered that more realistically mimicked the motions of a live turkey.

SUMMARY OF THE INVENTION

The instant invention is an important discovery in the art of turkey hunting decoys. The instant invention is a turkey decoy that mimics the side to side tail oscillation motions of a wild turkey. More specifically, the instant invention is a turkey decoy, comprising: a full body member, said full body member being a representation of the torso of an adult turkey, said full body member having an anterior portion, and a posterior portion; a tail assembly support member, said tail assembly support member being attached to the posterior portion of the full body member, said tail support member suitably adapted to support a tail assembly; a turkey tail assembly comprising a turkey tail fan and a turkey tail fanning mechanism suitably adapted to move the turkey tail fan such that the turkey tail fan may be positioned in an upright fanned state biased by a tail elastic member of the turkey tail assembly or the turkey tail fan can be lowered to an unfanned state by the relaxation of the tail elastic member of the turkey tail assembly; a first control line attached to the turkey tail assembly; a second control line attached to the turkey tail assembly so that when the first and second control lines are each pulled an equal length, the turkey tail fan is positioned in an upright fanned state biased by the tail elastic member and when the first and second control lines are then pulled an unequal length in relation to each other with the fanned state remaining biased by the tail elastic member, the fanned tail assembly oscillates to one side or the other side of the body member on the tail support member in response to the unequal length pulling of the control lines and so that when the first and second control lines are each released an equal length the turkey tail feathers are positioned in a lowered unfanned state biased by the relaxation of the tail elastic member.

The instant invention can further comprise a vertical support having a first end and a second end, the first end being attached to the body of the decoy, the second end pivotally attached to a base, the vertical support further comprising a first side arm extending in a direction toward one side of the body of the decoy, the vertical support further comprising a second side arm extending in a direction toward the other side of the body of the decoy, the first control line passing through an end portion of the first side arm, the second control line passing through an end portion of the second side arm, so that the body of the decoy can be rotated about the vertical support when the control lines are pulled an unequal length. In addition, the instant invention can yet further comprise the base being attached to a slide assembly biased in one direction by a slide elastic member and in the other direction by the relaxation of the slide elastic member so that when the first and second control lines are pulled, the turkey decoy moves in the one direction of the slide assembly and so that the turkey decoy moves in the other direction when the first and second control lines are released.

In another embodiment, the instant invention is a turkey decoy comprising: a tail assembly support member, said tail assembly support member being attached to a standard, said tail support member suitably adapted to support a tail assembly; a turkey tail assembly comprising a turkey tail fan and a turkey tail fanning mechanism suitably adapted to move the turkey tail fan such that the turkey tail fan may be positioned in an upright fanned state biased by a tail elastic member of the turkey tail assembly or the turkey tail fan can be lowered to an unfanned state by the relaxation of the tail elastic member of the turkey tail assembly; a first control line attached to the turkey tail assembly; a second control line attached to the turkey tail assembly so that when the first and second control lines are each pulled an equal length, the turkey tail fan is positioned in an upright fanned state biased by the tail elastic member and when the first and second control lines are then pulled an unequal length in relation to each other with the fanned state remaining biased by the tail elastic member, the fanned tail assembly oscillates to one side or the other side of the standard on the tail support member in response to the unequal length pulling of the control lines and so that when the first and second control lines are each released an equal length the turkey tail feathers are positioned in a lowered unfanned state biased by the relaxation of the tail elastic member In yet another embodiment, the instant invention is a method of oscillating a fanned turkey tail fan, the fanned turkey tail fan pivotally attached to a turkey decoy, a first control line attached to the fanned turkey tail fan, a second control line attached to the fanned turkey tail fan so that when the first control line is pulled against the fanned turkey tail fan with more force than the second control line is pulled against the fanned turkey tail fan, the fanned turkey tail fan oscillates to one side of the turkey decoy and so that when the second control line is pulled against the fanned turkey tail fan with more force than the first control line is pulled against the fanned turkey tail fan, the fanned turkey tail fan oscillates to the other side of the turkey decoy.

DETAILED DESCRIPTION OF THE INVENTION

Figure 1:
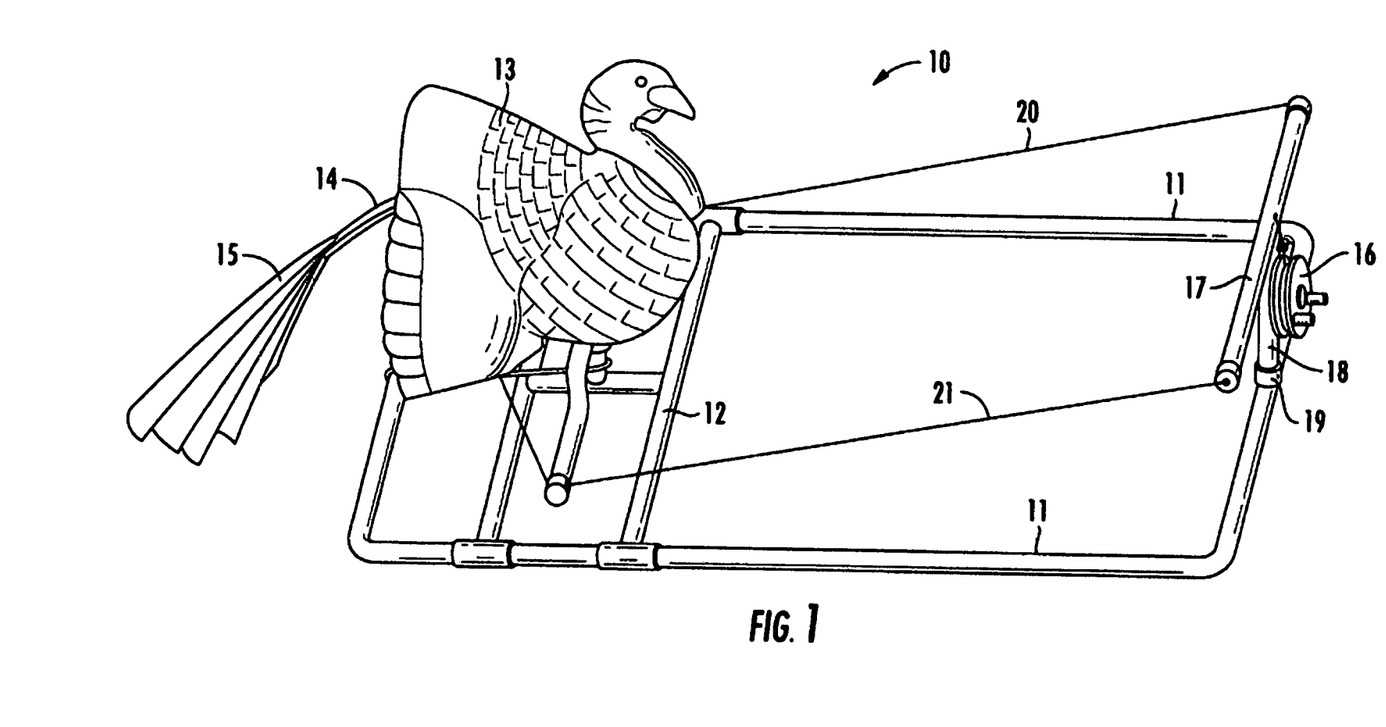
FIG. 1 is a perspective view of a preferred embodiment of the instant invention including a control bar assembly comprising reel onto which right and left control lines are reeled.
Figure 2:
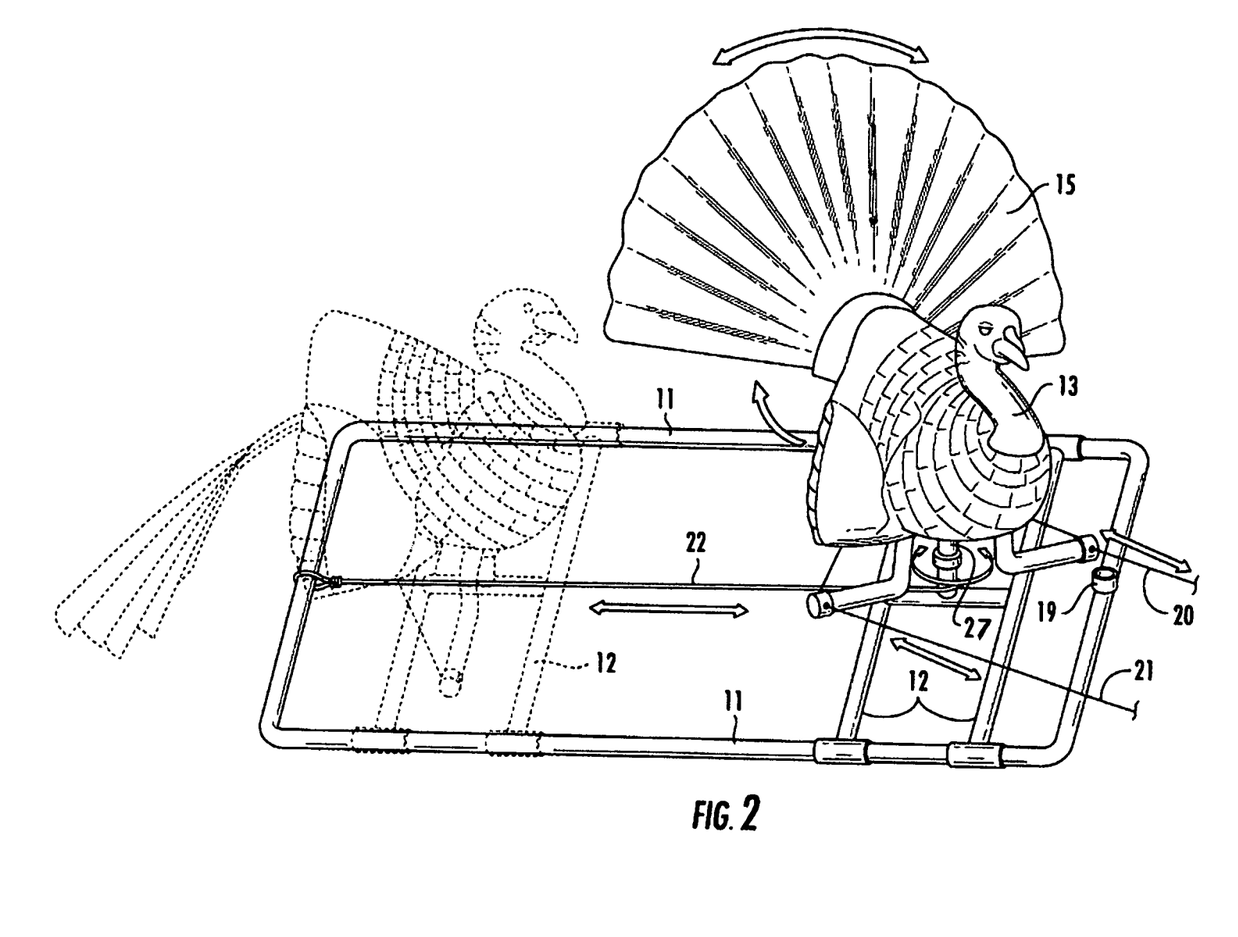
FIG. 2 is a perspective view of the embodiment shown in FIG. 1 wherein the control bar has been detached from the run way and wherein the tail of the decoy has been moved from a lowered position to a raised and fanned position by the pair of control lines, wherein the fanned tail of the decoy is oscillated by the control lines, wherein the decoy is moved forward and backward by the pair of control lines, and wherein the decoy is oscillated by the control lines.
Figure 3:
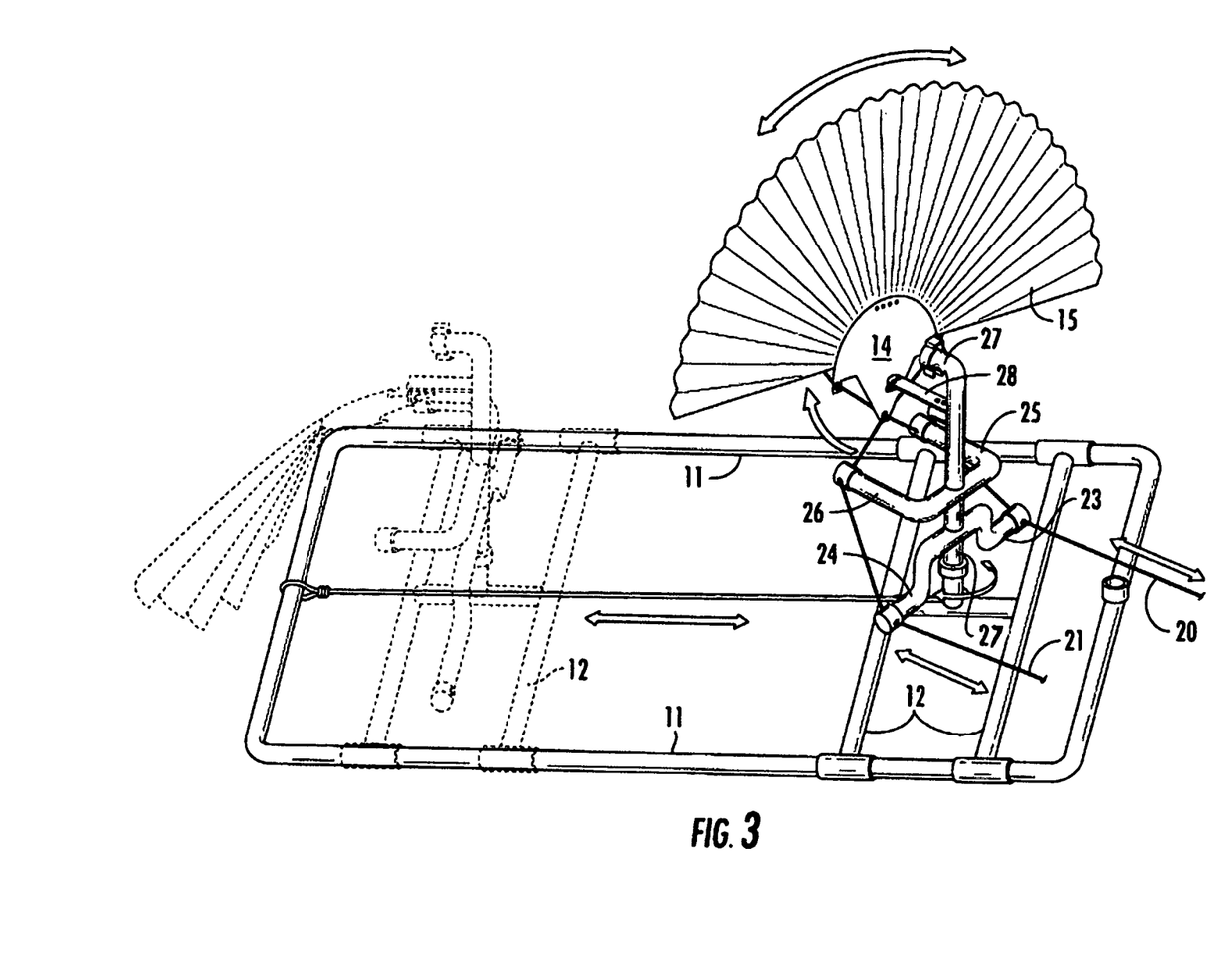
FIG. 3 is a perspective view of the embodiment shown in FIG. 2 with the body of the decoy removed.
Figure 7:
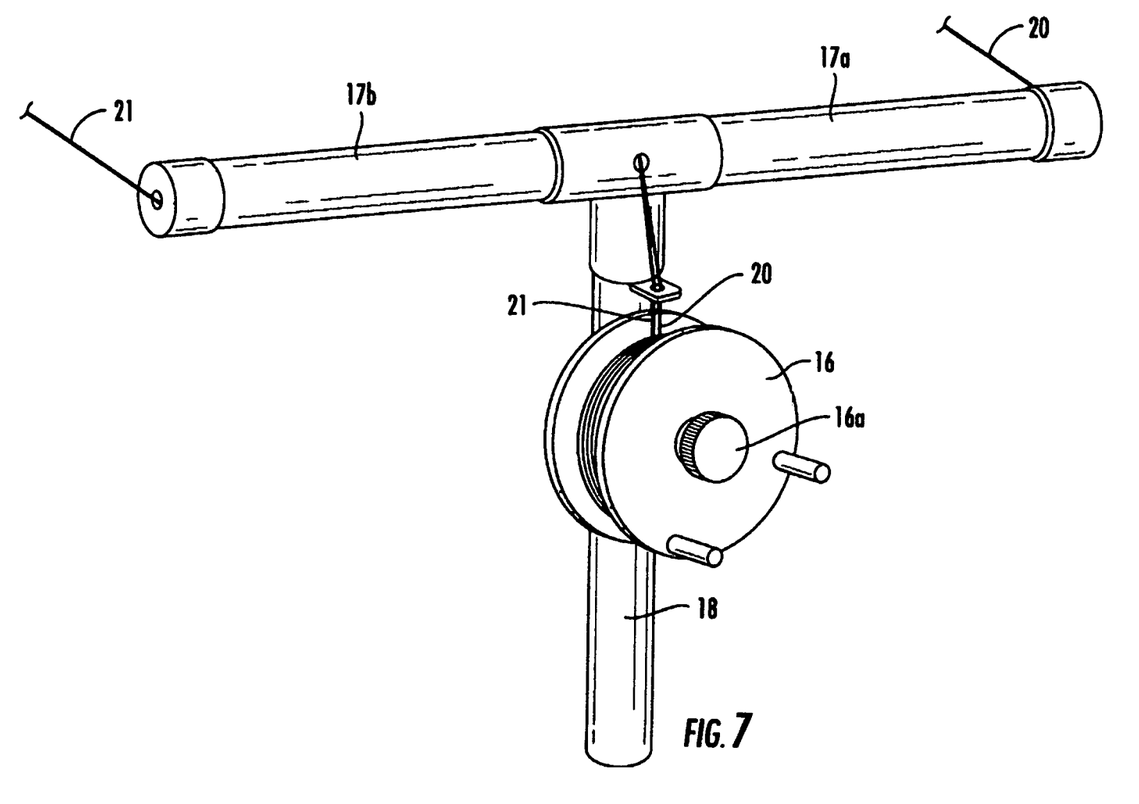
FIG. 7 is a detailed view of the control bar assembly of the embodiment shown in FIG. 1.

Referring now to FIG. 1, therein is shown a perspective view of a preferred embodiment 10 of the instant invention including a control bar assembly comprised of control bar 17, control bar standard 18 and reel 16 onto which right 20 and left 21 control lines are reeled. Embodiment 10 includes run way assembly 11, slide assembly 12, decoy body 13, tail assembly 14, pleated fabric tail 15, and control bar standard socket 19. Referring now to FIG. 7, therein is shown details of the control bar assembly including standard 18, left arm 17b, right arm 17a, and reel 16. Right control line 20 is directed through right arm 17a onto reel 16. Left control line 21 is directed trough left arm 17b onto reel 16. Reel 16 is attached to standard 18 by reel axel 16a. Referring now to FIG. 2, therein is shown a perspective view of the embodiment shown in FIG. 1 wherein the control bar 17 has been detached from the run way and wherein the tail 15 of the decoy is moved from a lowered position to a raised and fanned position by movement the pair of control lines 20 and 21, wherein the fanned tail of the decoy is oscillated by movement of the control lines 20 and 21, wherein the decoy is moved forward and backward by the pair of control lines 20 and 21, and wherein the decoy is oscillated by movement the control lines 20 and 21, all in the manner depicted. It will be noted that slide assembly 12 is connected to the rear of the run way assembly 11 by an elastic band 22. Referring now to FIG. 3, therein is shown a perspective view of the embodiment shown in FIG. 2 with the body 13 of the decoy removed to better show decoy mount standard 27, decoy mount lower right arm 23, decoy mount lower left arm 24, decoy upper right arm 25, decoy upper left arm 26, decoy mount 27, and tail assembly support 28. It should be understood that the use of decoy body 13 and the slide assembly 12 are not critical in the instant invention. Thus, the instant invention comprises a decoy not having a turkey body but comprising a turkey tail fan that can be raised from a lowered un-fanned position to a raised fanned position and oscillated from side to side by control lines 20 and 21.

Figure 8:
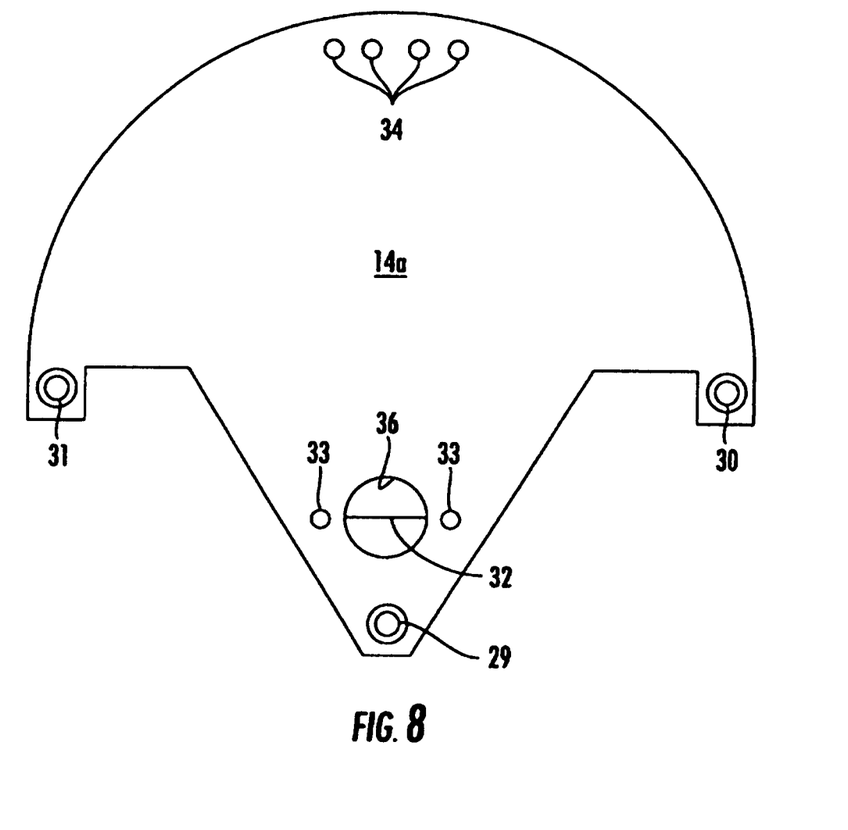
FIG. 8 is a view of the front panel of the tail assembly of FIG. 4.
Figure 9:
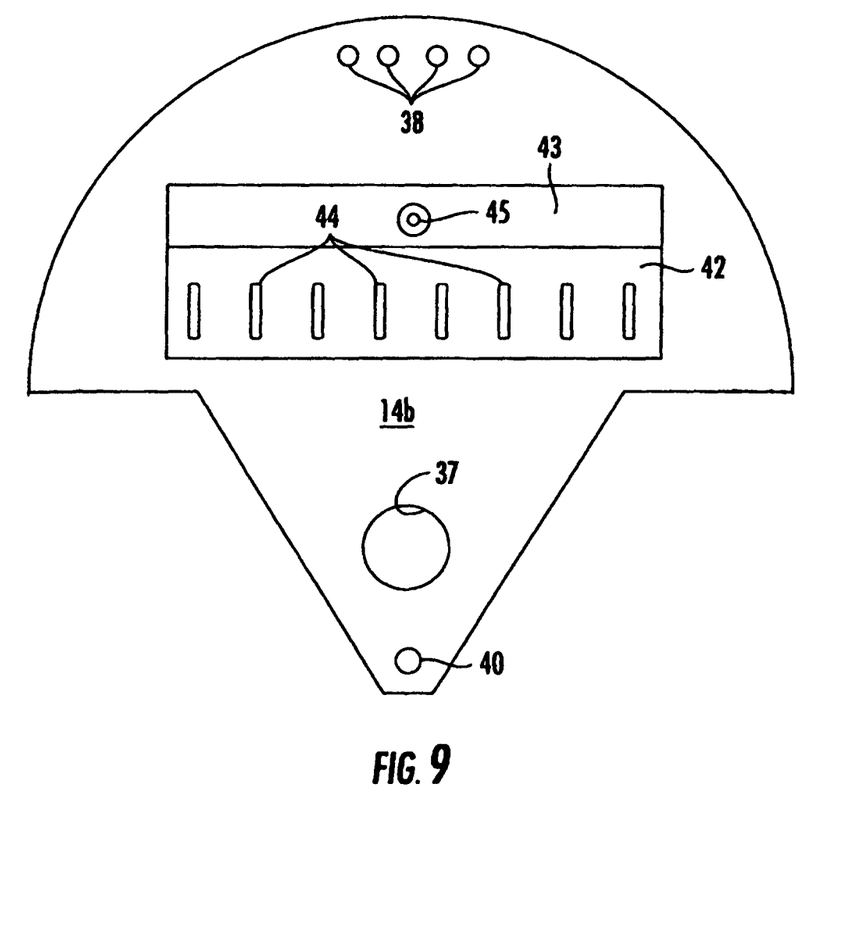
FIG. 9 is a view of the rear panel of the tail assembly of FIG. 4 also showing elastic strips stapled together and attached to the rear panel by a snap fastener.
Figure 10:
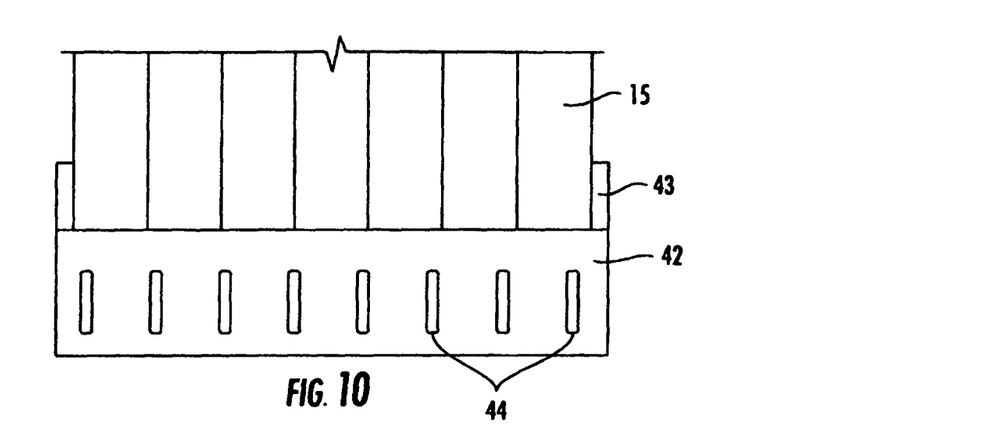
FIG. 10 depicts a pleated fabric tail fan attached to the elastic strips of FIG. 9.
Figure 11:
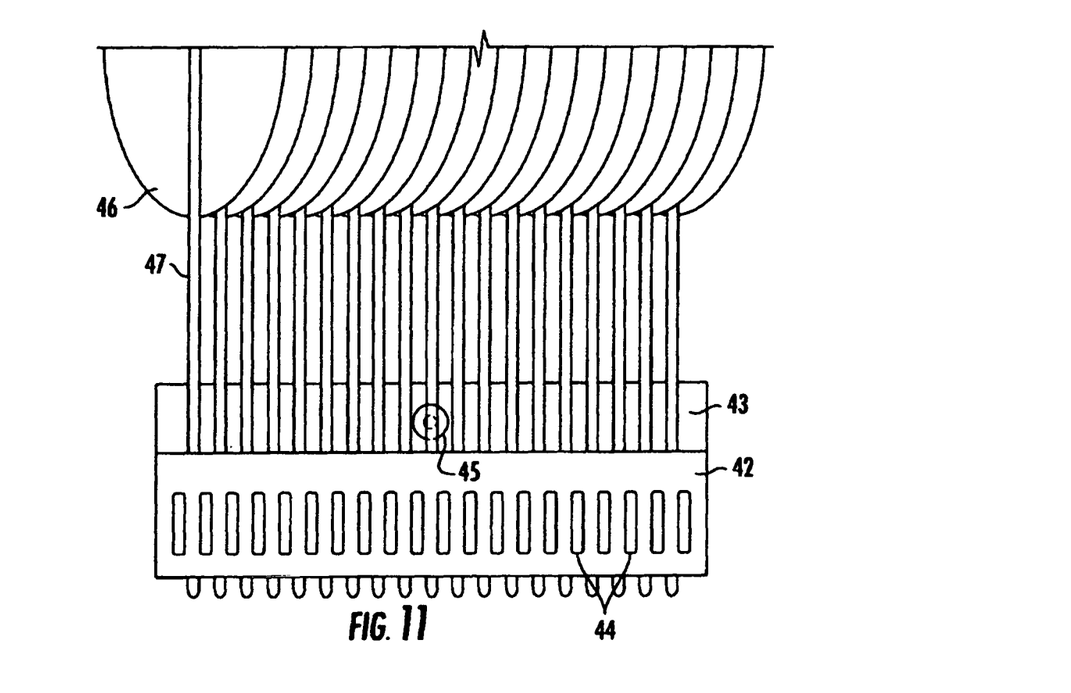
FIG. 11 depicts turkey tail feathers attached to elastic strips like the elastic strips of FIG. 9 but wherein more staples have been used.

Referring now to FIG. 8, therein is shown a drawing of the front panel 14a of the tail assembly 14. Front panel 14a comprises large aperture 36, wire 32 attached to the rear of panel 14a by metal rivets 33, small apertures 34 and metal eyelets 29, 30 and 31. Referring now to FIG. 9, therein is shown a drawing of the rear panel 14b of the tail assembly 14. Rear panel 14b comprises large aperture 37, small apertures 38 and intermediate sized aperture 40. Rear panel 14b also comprises rear elastic strip 43 front elastic strip 42, staples 44 fastening rear elastic strip 43 to front elastic strip 42, rear elastic strip 43 attached to panel 14b by snap fastener 45. Referring now to FIG. 10, therein is shown the plastic strip end of pleated fabric tail 15 (the tail salvaged from a PRIMOS CHICKEN ON A STICK decoy) stapled between elastic strips 42 and 43 by staples 44. Referring now to FIG. 11, therein is shown the quills 47 of turkey feathers 46 inserted into the pockets formed by staples 44 fastening rear elastic strips 42 and 43. Tail assembly 14 is formed by fastening front panel 14a to rear panel 14b by eyelet 29 (eyelet 29 engages with aperture 40 of rear panel 14b) and, in the case of a pleated fabric tail, a tie 51 (see FIG.

Figure 4:
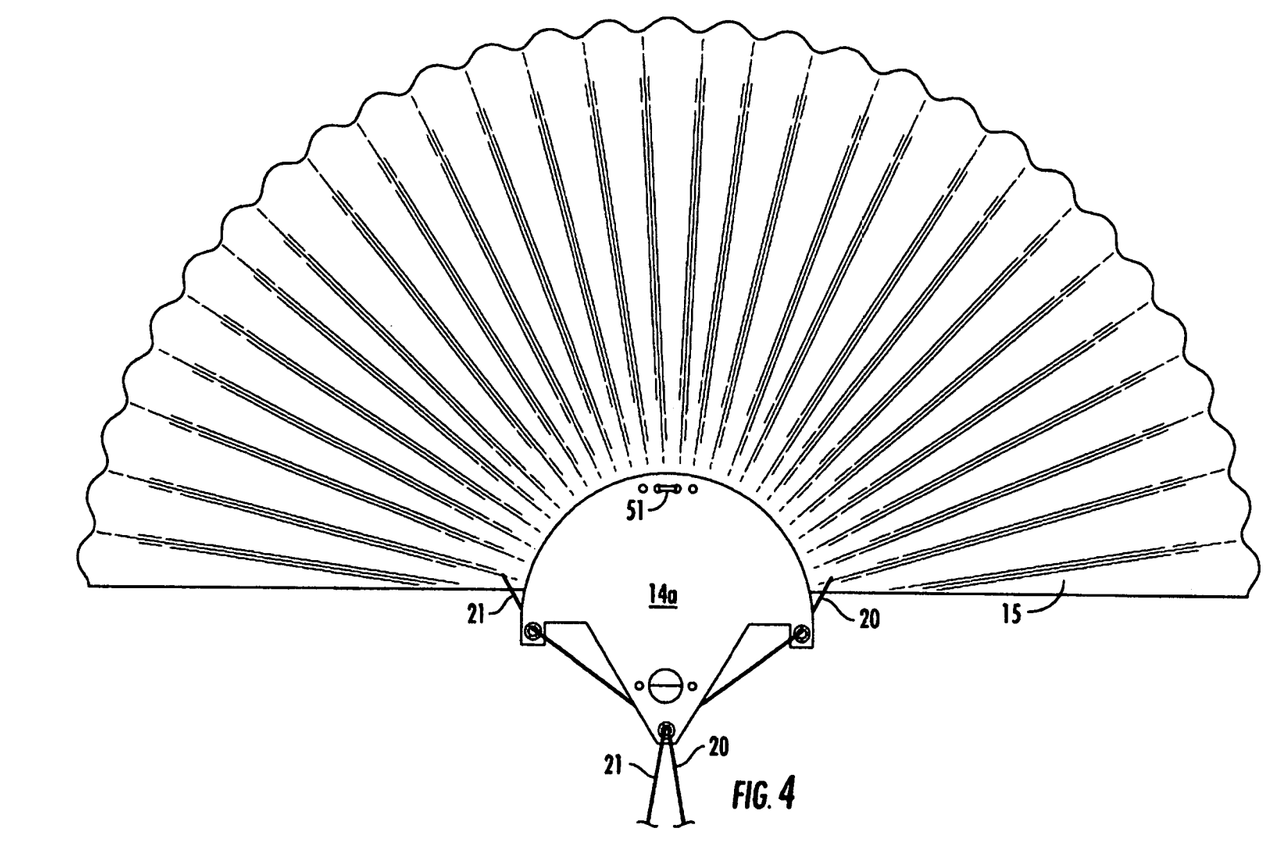
FIG. 4 is a front view of the tail assembly of the embodiment shown in FIG. 1.

4) through a pair of apertures 34 and 38, and in the case of turkey tail feathers a pair of ties through all four of apertures 34 and 38. Referring now to FIG. 4, therein is shown pleated fabric tail 15 in the fan position by tension of control lines 20 and 21 directed through eyelet 29, eyelets 30 and 31 to tail 15. The tension of control lines 20 and 21 causes tail 15 to fan by bending elastic strips 42 and 43 around snap fastener 45. Hook 28a, aperture 36 and wire 36 permit the tail assembly to pivot from an unfanned lowered position to an upright fanned position and permit the fanned tail fan to oscillate to either side of the decoy body depending on the pulling action of the control lines. It should be understood that the specific tail assembly shown is not critical in the instant invention and that, for example, the hook 28a, the aperture 36 and the wire 36 can be replaced with a ball and socket joint in the instant invention. Similarly, elastic strip 42 can be replaced with a coil spring or the like and that elastic band 22 can be replaced with a coil spring or the like.

Figure 5:
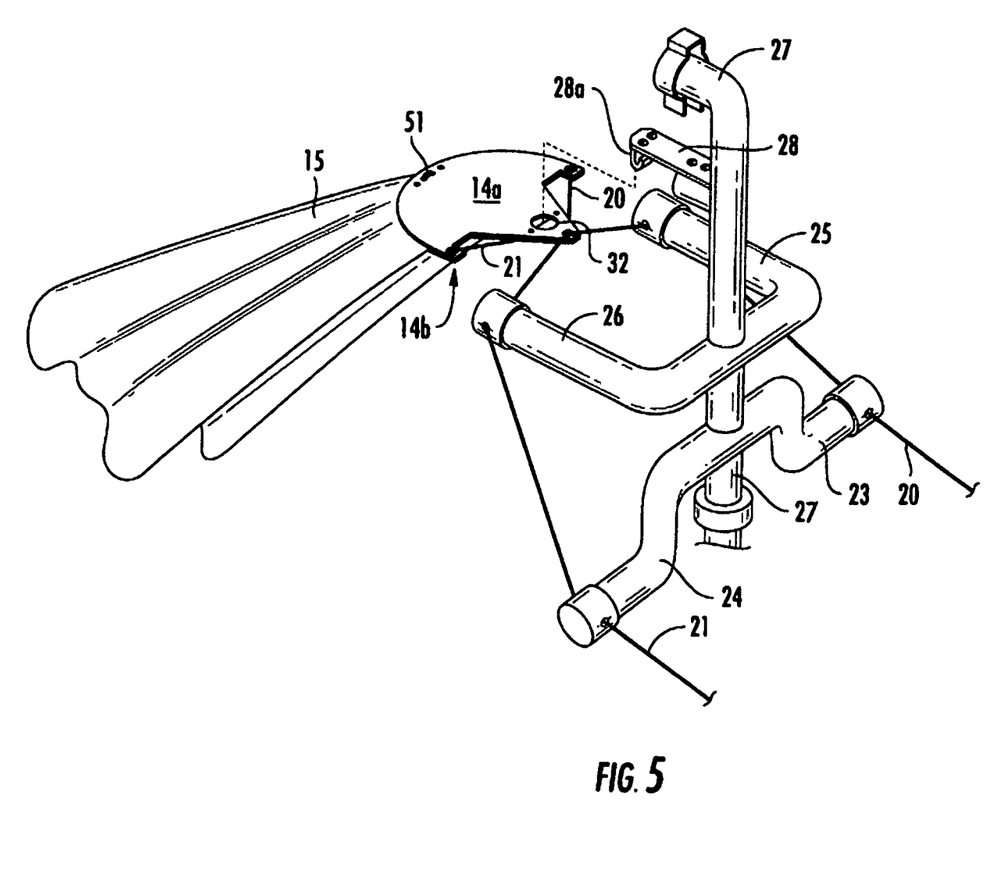
FIG. 5 is a detailed view of a portion of the embodiment shown in FIG. 3.
Figure 6:
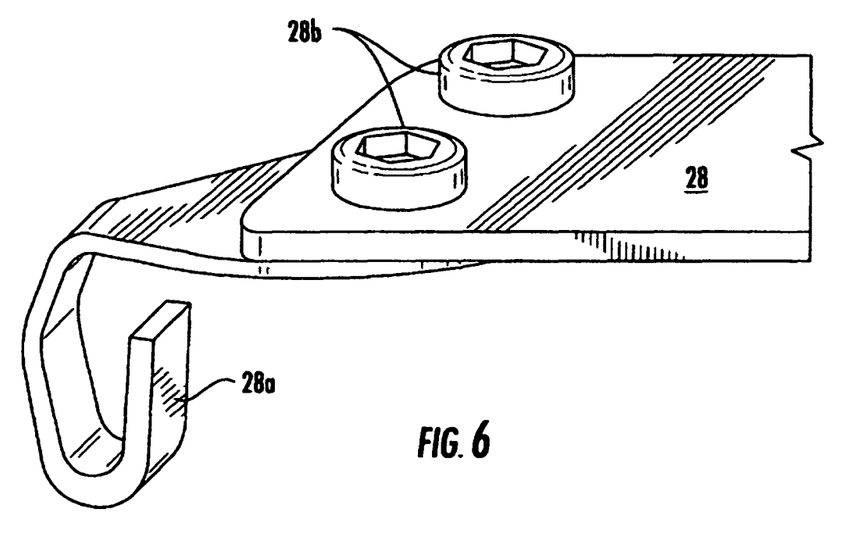
FIG. 6 is a detailed view of the tail assembly support hook of the embodiment shown in FIG. 5.

Referring now to FIG. 5, therein is shown a detailed view of a portion of the embodiment shown in FIG. 3 including tail assembly support 28. Referring now to FIG. 6, therein is shown a detailed view of tail assembly support hook 28a of tail assembly support 28 attached to tail assembly support 28 by fasteners 28b. Referring again to FIG. 5, wire 32 of front panel 14a of tail assembly 14 is positioned in support hook 28a as depicted by the dotted line of FIG. 5. Control lines 20 and 21 are directed through lower arms 23 and 24 and upper arms 25 and 26 as shown, and then to tail assembly 14 as detailed in FIG. 4.

Referring again to FIG. 3, when the control lines 20 and 21 are moved away from the runway 11, then the tail assembly 14 and tail 15 are moved from the position shown by dotted lines to the position shown with the tail fanned. The fanned tail of the decoy can be oscillated to one side of the decoy or to the other side of the decoy and the decoy can be oscillated on the decoy mount 27 by oscillation of the control bar. The decoy can be moved forward and backward by moving the control bar backwards and forwards. The decoy can be positioned remotely from the control bar by unreeling control lines 20 and 21 from reel 16. The movement of the decoy back and forth, the oscillations of the decoy and fan and the display of fan can be so finely controlled and controllable by the control bar movement that both male and female turkeys are completely mesmerized and approach the decoy in a manner as if the decoy were a live turkey.

Figure 12:
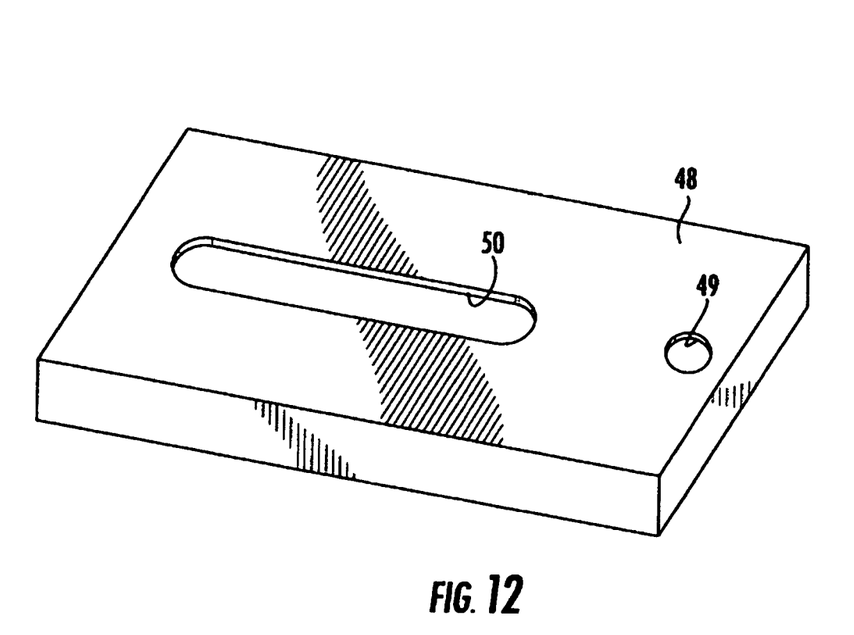
FIG. 12 is a perspective view of a cover for the embodiment shown in FIG. 1.

The components of the instant invention can be made of any suitable material but the run way 11, control bar assembly, slide assembly 12 and decoy mount of the embodiment 10 of FIG. 1 preferably are comprised of PVC pipe and PVC pipe fittings. The front panel of the tail assembly is preferably made of sheet metal. The rear panel of the tail assembly is preferably made from sheet PVC material. Pleated turkey tail fans are available as a component of commercially available turkey decoys such as the PRIMOS CHICKEN ON A STICK decoy. Fishing line is preferred for the control lines. A fishing line reel is preferred for the control line reel. A commercially available turkey decoy body is preferred for the turkey body of the instant invention. Turkey tail feathers can be used in the instant invention as depicted in FIG. 11 in which case the smaller feathers of a turkey tail are preferably attached to the tail assembly. Referring now to FIG. 12, a cover 48 is preferably positioned over run way 11 of the embodiment 10 shown in FIG. 1. Aperture 49 is provided for the passage of control bar assembly standard 18. Slot 50 is provided for the passage of decoy mount 27. Cover 48 is preferably camouflaged.

CONCLUSION

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains.

What is claimed is:

1. A turkey decoy, comprising:
   a full body member, said full body member being a representation of the torso of an adult turkey, said full body member having an anterior portion, and a posterior portion;
   a tail assembly support member, said tail assembly support member being attached to the posterior portion of the full body member, said tail support member suitably adapted to support a tail assembly;
   a turkey tail assembly comprising a turkey tail fan and a turkey tail fanning mechanism suitably adapted to move the turkey tail fan such that the turkey tail fan is movable between an upright fanned state biased by a tail elastic member of the turkey tail assembly and a lowered unfanned state by the relaxation of the tail elastic member of the turkey tail assembly;
   a first control line attached to the turkey tail assembly;
   a second control line attached to the turkey tail assembly so that when the first and second control lines are each pulled an equal length, the turkey tail fan is positioned in the upright fanned state biased by the tail elastic member and when the first and second control lines are then pulled an unequal length in relation to each other with the fanned state remaining biased by the tail elastic member, the fanned tail assembly oscillates to one side or the other side of the body member on the tail support member in response to the unequal length pulling of the control lines and so that when the first and second control lines are each released an equal length the turkey tail fan is positioned in the lowered unfanned state biased by the relaxation of the tail elastic member;
   a vertical support having a first end and a second end, the first end being attached to the body of the decoy, the second end pivotally attached to a base, the vertical support further comprising a first side arm extending in a direction toward one side of the body of the decoy, the vertical support further comprising a second side arm extending in a direction toward the other side of the body of the decoy, the first control line passing through an end portion of the first side arm, the second control line passing through an end portion of the second side arm, so that the body of the decoy is rotatable about the vertical support when the control lines are pulled an unequal length.

2. The turkey decoy of claim 1, wherein the turkey tail fan is comprised of pleated fabric.

3. The turkey decoy of claim 1, wherein the turkey tail fan is comprised of turkey tail feathers.

4. The turkey decoy of claim 1, further comprising the base being attached to a slide assembly biased in one direction by a slide elastic member and in the other direction by the relaxation of the slide elastic member so that when the first and second control lines are pulled, the turkey decoy moves in the one direction of the slide assembly and so that the turkey decoy moves in the other direction when the first and second control lines are released.

5. A turkey decoy, comprising:
  a tail assembly support member, said tail assembly support member being attached to a standard, said tail support member suitably adapted to support a tail assembly;
  a turkey tail assembly comprising a turkey tail fan and a turkey tail fanning mechanism suitably adapted to move the turkey tail fan such that the turkey tail fan is movable between an upright fanned state biased by a tail elastic member of the turkey tail assembly and a lowered unfanned state by the relaxation of the tail elastic member of the turkey tail assembly;
  a first control line attached to the turkey tail assembly;
  a second control line attached to the turkey tail assembly so that when the first and second control lines are each pulled an equal length, the turkey tail fan is positioned in the upright fanned state biased by the tail elastic member and when the first and second control lines are then pulled an unequal length in relation to each other with the fanned state remaining biased by the tail elastic member, the fanned tail assembly oscillates to one side or the other side of the standard on the tail support member in response to the unequal length pulling of the control lines and so that when the first and second control lines are each released an equal length the turkey tail fan is positioned in the lowered unfanned state biased by the relaxation of the tail elastic member.

6. The turkey decoy of claim 5, wherein the turkey tail fan is comprised of pleated fabric.

7. The turkey decoy of claim 5, wherein the turkey tail fan is comprised of turkey tail feathers.

8. The turkey decoy of claim 5, further comprising the standard being attached to a slide assembly biased in one direction by a slide elastic member and in the other direction by the relaxation of the slide elastic member so that when the first and second control lines are pulled, the turkey decoy moves in the one direction of the slide assembly and so that the turkey decoy moves in the other direction when the first and second control lines are released.

9. The turkey decoy of claim 5, further comprising two elastic strips fastening together; and
  wherein the turkey tail fan extends partially between the two elastic strips.

10. The turkey decoy of claim 9, wherein the turkey tail fan is comprised of turkey tail feathers;
  wherein each of the feathers has a respective quill; and
  wherein the quills extend between the two elastic strips.

11. The turkey decoy of claim 10, further comprising a plurality of staples fastening the two elastic strips together; and
  wherein each of the quills extends between a respective two of the staples.

12. A method of operating a turkey tail fan, the turkey tail fan pivotally attached to a standard, a first control line attached to the turkey tail fan, and a second control line attached to the turkey tail fan, the method comprising:
  causing the turkey tail fan to move from a lowered unfanned state to an upright fanned state by pulling equally on the first and second control lines;
  causing the turkey tail fan to oscillate in a first direction by pulling the first control line with more force than the second control line; and
  causing the turkey tail fan to oscillate in a second direction by pulling the second control line with more force than the first control line.

13. The method of claim 12, further comprising a full body member being a representation of the torso of an adult turkey, said full body member attached to said standard so that said fanned turkey tail fan is positioned at a posterior portion of the full body member.

* * * * *